UNITED STATES PATENT OFFICE.

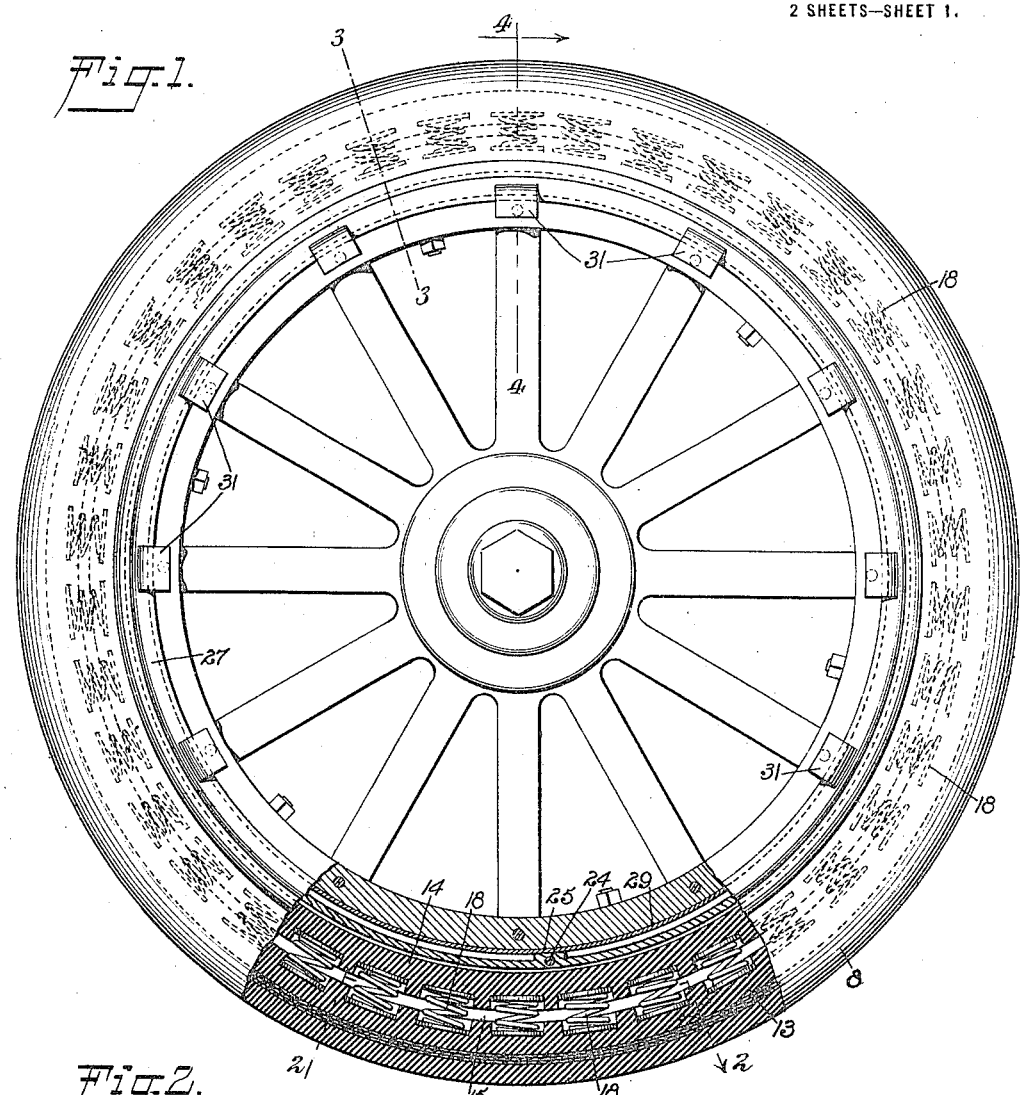
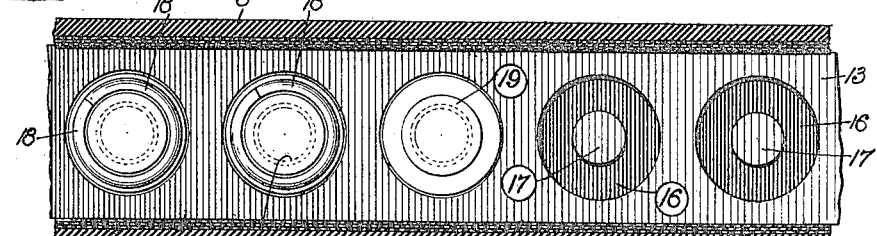

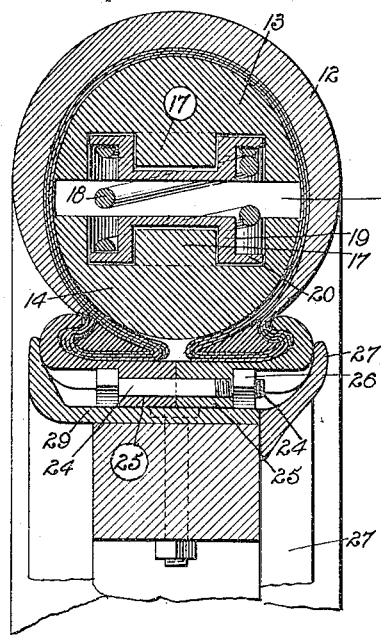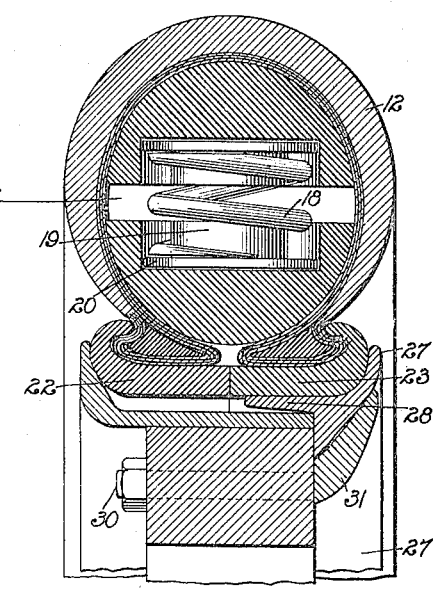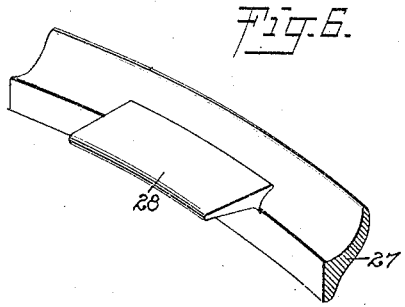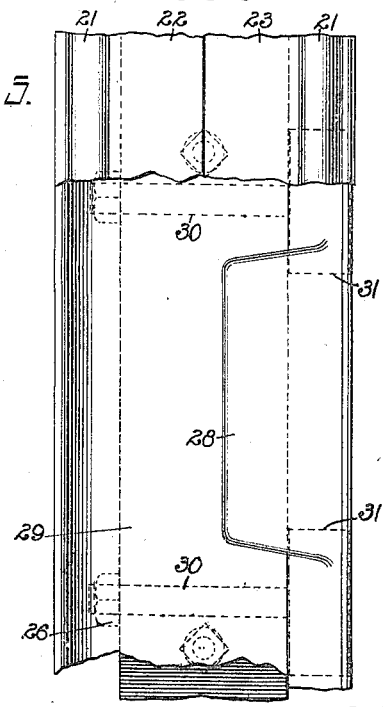

WILLIAM N. KNOWLTON, OF BROOKLYN, NEW YORK.

VEHICLE-WHEEL TIRE.

1,240,059.  Specification of Letters Patent.  Patented Sept. 11, 1917.

Application filed December 14, 1916. Serial No. 136,900.

*To all whom it may concern:*

Be it known that I, WILLIAM N. KNOWLTON, a citizen of the United States, and a resident of the city of New York, borough of Brooklyn, in the county of Kings and State of New York, have invented a new and Improved Vehicle-Wheel Tire, of which the following is a full, clear, and exact description.

Among the principal objects which the present invention has in view are: To avoid the necessity for the use of air in tires of the character described; to supply a multiplicity of independent resilient units for supporting the weight imposed on the wheel; to provide cushion members for the tire which may be readily and economically renewed; and to provide a substitute for the pneumatic tire used in vehicle wheels for employment in combination with conventional shoes or covers therefor.

Drawings.

Figure 1 is a side elevation of a wheel equipped with a tire constructed and arranged in accordance with the present invention, a portion of the wheel rim and tire being shown in section;

Fig. 2 is a section on an enlarged scale, the section being taken as on the line 2—2 in Fig. 1;

Fig. 3 is a cross section on an enlarged scale, the section being taken as on the line 3—3 in Fig. 1;

Fig. 4 is a cross section on an enlarged scale, the section being taken as on the line 4—4 in Fig. 1;

Fig. 5 is a detail view on an enlarged scale, showing fragments of the wheel rim, the tire rim, and wedging ring for said tire rim;

Fig. 6 is a detail view showing in perspective, a fragment of the wedging ring;

Fig. 7 is a detail view showing in perspective, an anchoring bolt for said wedging ring.

Description.

As seen in the drawings, the conventional shoe 12 is partially filled by shaping rings 13 and 14. The rings 13 and 14 are substantially semicircular in cross section, the curved surfaces being substantially concentric when separated to provide the intervening space 15 shown in the drawings and particularly in Figs. 3 and 4 thereof.

As seen best in Fig. 2 of the drawings, the ring 13 has a series of recesses 16 which open from the flat inner surface thereof. The recesses 16 are preferably annular, the center being filled by a boss 17 in each of said recesses. A corresponding series of recesses 16 are formed in the ring 14. The recesses in the rings 13 and 14 are alined to conform with the radii of the tire or wheel on which the same is mounted.

The rings 13 and 14 are normally held in spaced relation by coiled metallic springs 18. To form bearings for the springs 18, a series of metal caps 19 are mounted, one on each of the bosses 17, as shown best in Figs. 3 and 4 of the drawings. The caps 19 have each a base flange 20 whereon the springs 18 rest while the hollow domes of the caps rest over in guided relation to the bosses 17.

Normally the action of the springs 18 separates the rings 13 and 14 a distance greater than that shown in the drawings where said springs and rings are represented as in position to partially compress the said springs.

The springs 18 are calculated to support the weight of the wheel and the normal load imposed thereon, when compressed by the rings 13 and 14 and the shoe 12 which is drawn thereover.

In the preferred form of tire disclosed, the clencher type is used. To receive the beads of the shoe 12, the sections of the tire rim are each provided with rolled edges 21 wherein are formed the clencher grooves for the tire.

The tire rim in the present invention is constructed in two sections or annular halves 22 and 23. These halves are separable on the median plane and in service are held together by bolts 24. The bolts 24 extend through lugs 25 on each of the sections 22 and 23. The bolts 24 are each provided with a screw-thread section to receive a nut 26 which holds the sections 22 and 23 together after the same have been contracted to the service relation, an operation requiring a special tool or jack which is employed to draw the shoe 12 over the rings 13 and 14, compressing the springs 18 to the service relation thereof.

When the bolts 24 have been disposed as in service and the nuts 26 have been tightened thereon, the tire is in its completed condition and may be thereafter handled like any of the well-known types of demountable tires.

In the drawings there is shown the wedge ring 27 as having a series of wedging platforms 28. These are provided in the present construction to fill the space between the wheel rim 29 and the tire rim having the sections 22 and 23, said space being left to receive the lugs 25 and bolts 24 therein. The ring 27 is introduced after the tire equipped with its rim has been adjusted to the rim 29. The ring 27 as in the conventional construction, is held by clamp bolts 30 having heads 31 for engaging the outer surface of the wedge ring 27.

It is obvious that when provided with tires constructed and arranged as shown and described, the resiliency of the tire is imparted thereto by the springs 18, each of which contracts under the load when directly imparted thereto and expands when relieved therefrom by the rotation of the wheel.

It is also obvious that if one or more of the springs 18 should become broken and require removal from the tire, the bolts 30 are released and the heads 31 rotated from the path of the ring 27. After removing the ring 27, the tire with the tire rim having the sections 22 and 23 may be pulled or drawn from the rim 29. Having the tire removed from the wheel, the nuts 26 are removed from the bolts 24, to permit the expansion of the bead edges of the shoe 12 and the sections 22 and 23 operatively connected therewith.

After removing the sections 22 and 23, the inner edges of the shoe may be spread sufficient to permit the pull on the inner ring 14, with the result that the various recesses 16 are exposed.

The broken or weakened spring 18 may then be removed and replaced when the ring 14 is readjusted to the said springs and the ring 13. In this position of the rings 13 and 14 and the intermediate springs 18, the shoe 12 is again adjusted to the sections 22 and 23 to be drawn together for compressing the said springs 18 and for establishing the service relation of the various parts of the tire.

*Claims.*

1. A vehicle wheel tire comprising a pliable non-stretchable shoe having retaining edges; a plurality of separable rim sections, each having a flange for engaging one of said retaining edges; a filler for said shoe, said filler embodying two opposed continuous resilient cushion rings, said rings being complementary and forming inner and outer portions of a body substantially circular in cross section, and said rings having a series of annular recesses formed in the opposed surfaces of said rings; a plurality of disconnected metallic springs disposed in said recesses and between said cushion rings in juxtaposed relation for normally maintaining said rings in spaced relation, said springs being adapted to separate said rings beyond the normal service relation thereof when not restrained by said shoe and said rim sections; and means for permanently holding said rim sections united for contracting said filler within said shoe.

2. A vehicle wheel tire comprising a pliable non-stretchable shoe having retaining edges; a plurality of separable rim sections, each having a flange for engaging one of said retaining edges; a filler for said shoe, said filler embodying two opposed continuous resilient cushion rings, said rings being complementary and forming inner and outer portions of a body substantially circular in cross section, and said rings having a series of annular recesses formed in the opposed surfaces of said rings; a plurality of disconnected metallic springs disposed in said recesses and between said cushion rings in juxtaposed relation for normally maintaining said rings in spaced relation, said springs being adapted to separate said rings beyond the normal service relation thereof when not restrained by said shoe and said rim sections; means for permanently holding said rim sections united for contracting said filler within said shoe; and a plurality of metal caps fitting said annular recesses for forming wearing surfaces for said springs.

WILLIAM N. KNOWLTON.

Copies of this patent may be obtained for five cents each, by addressing the "Commissioner of Patents, Washington, D. C."